United States Patent
Lutzer

(10) Patent No.: US 9,599,263 B2
(45) Date of Patent: Mar. 21, 2017

(54) MOVABLE COUPLING FOR A PIPELINE, TANK ARRANGEMENT, AND AIRCRAFT OR SPACECRAFT

(75) Inventor: Wilhelm Lutzer, Zarpen (DE)

(73) Assignee: Airbus Operations GmbH, Hamburg (DE)

(*) Notice: Subject to any disclaimer, the term of this patent is extended or adjusted under 35 U.S.C. 154(b) by 1144 days.

(21) Appl. No.: 13/619,198

(22) Filed: Sep. 14, 2012

(65) Prior Publication Data

US 2013/0069363 A1  Mar. 21, 2013

Related U.S. Application Data

(60) Provisional application No. 61/535,091, filed on Sep. 15, 2011.

(30) Foreign Application Priority Data

Sep. 15, 2011  (DE) .................. 10 2011 082 762

(51) Int. Cl.
  *F16L 27/10* (2006.01)
  *F16L 27/08* (2006.01)
  (Continued)

(52) U.S. Cl.
  CPC .............. *F16L 27/08* (2013.01); *B64D 11/02* (2013.01); *F16L 27/026* (2013.01)

(58) Field of Classification Search
  USPC ....... 285/223, 224, 298, 302, 349, 267, 270, 285/351
  See application file for complete search history.

(56) References Cited

U.S. PATENT DOCUMENTS 2,649,315 A  8/1953 Ipsen
3,306,620 A  2/1967 Taschenberg
(Continued)

FOREIGN PATENT DOCUMENTS

DE  2 229 862  1/1974
DE  27 53 836  6/1978
(Continued)

OTHER PUBLICATIONS

German Office Action for Application No. 10 2011 082 762.5 dated Oct. 5, 2012.
(Continued)

*Primary Examiner* — Aaron Dunwoody
(74) *Attorney, Agent, or Firm* — Jenkins, Wilson, Taylor & Hunt, P.A.

(57) ABSTRACT

A movable coupling for a pipeline, which can be applied in aviation and aerospace. The coupling includes a dip pipe, a counter piece and a displaceable component. The counter piece has a passage, into which the dip pipe is inserted. The counter piece has a holder extending from the passage. The component includes a clearance that the dip pipe extends through. A portion of the displaceable component is received in the holder so the displaceable component can be displaced relative to the counter piece in a direction not parallel to the longitudinal axis of the dip pipe. When the dip pipe moves relative to the counter piece, the displaceable component is tight against the dip pipe and also against the counter piece. A tank arrangement includes a tank with a pipeline connected to the tank and including a movable coupling.

15 Claims, 5 Drawing Sheets

(51) Int. Cl.
*B64D 11/02* (2006.01)
*F16L 27/02* (2006.01)

(56) References Cited

U.S. PATENT DOCUMENTS

| | | | | | |
|---|---|---|---|---|---|
| 3,853,336 | A | * | 12/1974 | Shank | F16J 9/00 |
| | | | | | 285/18 |
| 5,009,455 | A | * | 4/1991 | Irvine | F16L 27/12 |
| | | | | | 285/106 |
| 6,059,323 | A | * | 5/2000 | Ekholm | F16L 27/125 |
| | | | | | 277/603 |

FOREIGN PATENT DOCUMENTS

| | | |
|---|---|---|
| DE | 693 00 458 | 3/1996 |
| EP | 0 112 965 | 7/1984 |
| EP | 1 085 247 | 3/2001 |
| EP | 1 988 319 | 11/2008 |
| EP | 2 261 543 | 12/2010 |
| WO | WO 97/05419 | 2/1997 |

OTHER PUBLICATIONS

Extended European Search Report for Application No. 12 18 4337.9 dated Feb. 4, 2013.

* cited by examiner

MOVABLE COUPLING FOR A PIPELINE, TANK ARRANGEMENT, AND AIRCRAFT OR SPACECRAFT

CROSS-REFERENCE TO RELATED APPLICATIONS

This application claims the benefit of and priority to both U.S. Provisional Application 61/535,091, filed Sep. 15, 2011, and to German Patent Application No. 10 2011 082 762.5, filed Sep. 15, 2011, the entire disclosures of which are incorporated herein by reference.

FIELD OF THE INVENTION

The present invention relates to a movable coupling for a pipeline, to a tank arrangement comprising a movable coupling of this type, and to an aircraft or spacecraft comprising a movable coupling of this type and/or comprising a tank arrangement of this type.

TECHNICAL BACKGROUND OF THE INVENTION

Although the invention is applicable to any pipelines, the present invention and the set of problems on which it is based are explained in greater detail in the following by way of a pipeline for emptying a waste water tank of an aeroplane.

In modern commercial aeroplanes, waste water tanks are required for collecting waste water from the toilets, washbasins and the like which are located on board. A waste water tank of this type may for example be arranged inside the aircraft fuselage between a floor structure and a fuselage outer skin, and be mounted on the fuselage structure.

Orderly emptying of a waste water tank of this type should be provided during the idle time of the aeroplane on the ground. For this purpose, the waste water tank is provided with a pipeline, for example in the lower region thereof. This pipeline connects the waste water tank to what is known as the "waste service panel", a means which is conventionally arranged in the region of the outer skin and arranged substantially immovably in relation thereto, and which makes orderly emptying of the waste water tank possible. While the aircraft is located on the ground, the "waste service panel" for emptying the waste water tank is accessible from the outside of the aeroplane fuselage. A valve, to which the pipeline is coupled, and by means of which the escape of liquid from the waste water tank through the pipeline can be prevented or released, may be arranged on this "waste service panel".

During flight, however, the fuselage of a modern commercial aeroplane does not behave as a completely rigid body, but is subject in a known manner to deformation, known as "blowback", of the fuselage, predominantly when cruising at high altitudes, as a result of air pressure differences between the respective part of the fuselage internal space and the surrounding atmosphere. Cooling of the fuselage structure, as a result of the low air temperatures in the surrounding atmosphere at flight altitudes, also has an influence on the deformation of the fuselage. Further, flight manoeuvres, which are brought about in particular by rudder deflections, also contribute to a deformation and/or distortion of the aeroplane fuselage.

At the conventional size of the waste water tank which is mounted on the structure, it is thus possible for a relative movement and thus a non-negligible displacement and/or angular offset of the pipeline which empties the tank to occur, relative to the "waste service panel" and the valve which is fastened thereto, by comparison with the state of the aeroplane when located on the ground. These relative movements have to be taken into account so as to ensure tightness of the coupling of the pipeline to the valve in the event of relative movements of this type in regular flight operation.

Against this background, an idea of the present invention is to provide a movable coupling for a pipeline which makes it possible to compensate relative movements of this type and at the same time requires as little space as possible.

SUMMARY OF THE INVENTION

According to the invention, this is achieved by a movable coupling for a pipeline, by a tank arrangement, and/or by an aircraft or spacecraft according to aspects of the invention.

Accordingly, a movable coupling for a pipeline is provided which can advantageously be made use of in particular in air or space travel.

The movable coupling which is proposed according to the invention comprises a dip pipe, a counter piece and a displaceable component. The counter piece is provided with a passage. The dip pipe is inserted into the passage. The counter piece further comprises a holder which extends from the passage. A portion of the displaceable component is received in the holder in such a way that the displaceable component can be displaced relative to the counter piece in a direction which is not parallel to the longitudinal axis of the dip pipe. The displaceable component is moreover equipped with a clearance through which the dip pipe extends. According to the invention, in this context the displaceable component is formed in such a way that it is tight against the dip pipe in a first sealing region and also against the counter piece in a second sealing region when the dip pipe moves relative to the counter piece.

According to the invention, a tank arrangement is further proposed, which is suitable in particular for an application in an aircraft or spacecraft and which comprises a tank, a pipeline which is connected to the tank, and a movable coupling according to the invention. In this context, the movable coupling couples the pipeline to a means which is movable relative to the tank, it being possible as a result to produce a fluid-bearing connection of the tank to the means.

Further, according to the invention an aircraft or spacecraft, in particular an aeroplane, particularly preferably a passenger aeroplane, is equipped with a movable coupling of this type for a pipeline and/or with a tank arrangement of this type.

The idea behind the present invention is that the displaceable component, through the clearance of which the dip pipe extends, can move together with the dip pipe if the dip pipe moves relative to the counter piece. In a direction which is at an inclination to the longitudinal axis of the dip pipe, and in particular in a direction which extends perpendicular to the longitudinal axis of the dip pipe, this movement can be compensated by the displaceability of the displaceable component. Because the displaceable component is still sealed against both the counter piece and the dip pipe during this relative movement, the axial offset of the dip pipe and the counter piece, which is induced by the movement and changes for example during flight manoeuvres, is compensated without the coupling between the dip pipe and the counter piece becoming untight. By providing the displaceable component, which takes on sealing functions against both the dip pipe and the counter piece and makes axial displacement possible, the coupling according to the invention avoids a high space requirement. With the coupling as proposed by the present invention, it is possible to react, in a simple manner, to a larger movability which is to be compensated between the two pipeline parts, for example the emptying line of a waste water tank relative to a "waste service panel" in an aircraft, by way of a size adjustment of the holder and the displaceable component. In the solution according to the invention, only a little additional space is required for this purpose in the direction transverse to the axis. In this context, it is advantageously possible to avoid a space requirement, in the direction of the longitudinal axis of the pipeline, which increases with increasing axial offset.

With the movable coupling according to the invention, relative movements which are expressed as displacements of the dip pipe along the longitudinal axis thereof relative to the counter piece can further be compensated in that the dip pipe extends through the clearance of the displaceable component. When the displaceable component is tight against the dip pipe in the first sealing region at the same time, the dip pipe can advantageously be displaced back and forth along the longitudinal axis thereof in the holder of the displaceable component. To change the region of the possible offset along the longitudinal axis of the dip pipe, it is merely necessary to vary the lengths by which the dip pipe extends on either side of the displaceable component.

Advantageous improvements and embodiments of the invention are found in the dependent claims.

In accordance with a preferred embodiment, the first sealing region is arranged in the region of a surface of the clearance which faces the dip pipe. As a result, a particularly compact configuration of the movable coupling is achieved.

In a further embodiment, the displaceable component, as viewed in a cross-section in the plane in which the longitudinal axis of the dip pipe is positioned, is formed with a rounding in the first sealing region. Additionally or alternatively, the displaceable component, as viewed in a cross-section in this plane, may taper towards the first sealing region. As a result of a rounding or tapering of the displaceable component in the first sealing region, and in particular as a result of a combination of both, it can advantageously be provided that an inclination of the longitudinal axis of the dip pipe relative to a longitudinal axis of the counter piece (in other words an angular offset of the two axes) can also be compensated even better by means of the movable coupling. In this context, the tapering and/or rounding can ensure that the displaceable component is tight against the dip pipe even more reliably, even when the two are at an inclination to one another.

An advantageous development of the invention provides that the displaceable component is formed in one piece from a resilient material, in particular an elastomer. Alternatively, in accordance with this embodiment the displaceable component can be formed in one piece from a resilient material, in particular an elastomer, having a metal inlay which is embedded in the resilient material. In this context, a portion of the displaceable component is in the form of a resilient sealing element, which is tight against the dip pipe in the first sealing region. A displaceable component which is formed in one piece may be found to be advantageous during the assembly of the movable coupling, in particular because no separate sealing elements have to be inserted and no individual parts can be lost. Further, in this development the sealing element cannot be released from the displaceable component as a result of the relative movement of the dip pipe and the counter piece. Depending on the size of the movable coupling and the requirements on the tightness, it may also be found to be advantageous to integrate the metal inlay for supporting and rigidifying the displaceable component into said component. For example, a support ring, for example made of steel, can be cast into the elastomer as a metal inlay during the production of the displaceable component.

In one embodiment, a suitable industrial rubber material may be used for the elastomer for producing a single-piece displaceable component of this type. Possible materials for this purpose are for example an ethylene propylene rubber (EPDM), a polyurethane rubber or a fluorosilicone rubber. The single-piece displaceable component may be shaped for example by elastomer moulding.

In accordance with a further advantageous development, the displaceable component is formed in two or more parts with a base body and a resilient sealing element. In this context, the sealing element is tight against the base body and, in the first sealing region, against the dip pipe. The configuration of the displaceable component in two or more parts makes it possible to change the sealing element without having to replace the entire displaceable component. Further, in this development of the invention, the base body can also be formed from a different material from the resilient sealing element.

In one embodiment, the base body of the displaceable component, which is formed in two or more parts, is manufactured from a metal, in particular from a steel or from titanium or from a titanium alloy. This embodiment can improve the durability and mechanical strength of the displaceable component.

In a further configuration, the base body of the displaceable component, which is formed in two or more parts, is manufactured from a suitable plastics material, for example from PTFE (polytetrafluoroethylene). A base body which is made from plastics material can be manufactured comparatively cost-effectively. If the displaceable component is made from PTFE, the lower coefficient of friction of the polytetrafluoroethylene makes reduced frictional forces possible when the displaceable component is displaced in the holder, and thus also makes low wear possible, the displaceable component also, at the same time, having a high resistance to a wide range of substances. At the same time, PTFE also provides good tightness, in particular in the second sealing region.

In a further development of the invention, the base body is provided with a groove in the first sealing region and the sealing element is in the form of a sealing ring, in particular an O-ring, which is laid in the groove. By means of the groove, the sealing ring can be held reliably in the first sealing region for sealing. O-rings in particular are available relatively cost-effectively in a wide range of materials and sizes. With a round cross-section of the O-ring, it is further possible to form a rounding in the first sealing region in a simple manner. The rounded surface of the O-ring which faces the dip pipe can press up tight against the dip pipe under resilient compression, specifically both when the longitudinal axes of the dip pipe and the counter piece are parallel and when the longitudinal axis of the dip pipe is at an inclination to the longitudinal axis of the counter piece.

In one development, the holder comprises mutually opposing walls, which are not parallel to the longitudinal axis of the dip pipe. In this context, the displaceable component is guided displaceably between the walls of the holder. Further, in this development the second sealing region is arranged in the region of at least one of the walls. The holder thus advantageously makes it possible to guide the displaceable component displaceably while at the same time having uninterrupted sealing of the displaceable component against the counter piece in the second sealing region.

In an improvement on the invention, the displaceable component has an annular end face. In this context, a resiliently compressible protrusion, which is preferably rounded in form, is provided on the end face, and is tight against one of the walls of the holder in such a way that the displaceable component is tight in the second sealing region. In particular if the displaceable component is formed in one piece, this can be advantageous so as to provide that the displaceable component is tight in the second sealing region, with relatively low forces and thus also comparatively low friction between the displaceable component and the holder.

In accordance with a further embodiment, the displaceable component is formed with resilient lips on the side remote from the dip pipe. In this context, the resilient lips are each tight against one of the walls of the holder in such a way that the displaceable component is tight in the second sealing region. In particular, if the displaceable component is formed in two or more parts, the lips may be formed integrally with the base body of the displaceable component. This configuration can advantageously contribute to a reduction in the required number of individual components for the displaceable component and make it simpler to assemble. In particular if the lips are formed integrally with the base body, low friction of the displaceable component in the holder can be achieved if a suitable material is selected for the base body.

In one embodiment, a web is formed on the displaceable component between the resilient lips. In this context, there is a sealing ring, which may in particular be in the form of an O-ring, on the web. The sealing ring is arranged between mutually facing surfaces of the resilient lips, and, as a result of the resilience thereof, spreads the resilient lips apart resiliently until the resilient lips are positioned against the walls of the holder. With this configuration, the lips can advantageously be biased resiliently against the walls of the holder in a very simple manner, the web providing that the sealing ring does not go in too deep between the surfaces of the resilient lips, but instead, a resilient deformation of the cross-section of the sealing ring can exert the full effect thereof to spread the lips apart.

In accordance with a further embodiment of the invention, one of the walls of the holder is provided with a groove in which a sealing ring, in particular an O-ring, is provided in such a way that the displaceable component is tight in the second sealing region. As a result, the displaceable component can advantageously be of a simpler configuration. The sealing ring can be changed as necessary.

In accordance with an advantageous development, the displaceable component can be provided with a friction-reducing coating, in particular with a coating which is made of a PTFE (polytetrafluoroethylene). The displaceable component can be coated completely or only in portions, in particular in the region of the first and second sealing surfaces. As a result, the friction between the displaceable component and the dip pipe in the first sealing region and between the displaceable component and the counter piece in the second region can be reduced, and as a result the displaceable component can be displaced without too great a resistance if the dip pipe moves relative to the counter piece. This development may be advantageous both if the displaceable component is formed in one piece and if it is formed in two or more pieces. In particular, a sealing ring which is provided in the first and/or in the second sealing region, for example in the form of an O-ring, can be provided with a friction-reducing coating of this type in each case.

In an advantageous embodiment, the holder is in the form of a shaft which completely encloses the dip pipe in a circumferential direction of the dip pipe. In this context, the shaft extends outwards from the passage, in particular substantially radially. This embodiment can advantageously make it possible to displace the displaceable component throughout the plane in which the shaft encloses the dip pipe, and thus to compensate axial offsets in any direction transverse to the longitudinal axis of the dip pipe.

In a further advantageous embodiment, an external cross-section of the dip pipe and an internal cross-section of the holder of the displaceable component are each substantially circular in form. This embodiment makes it possible also to compensate a rotation of the dip pipe relative to the counter piece, about the longitudinal axis of the counter piece or about the longitudinal axis of the dip pipe, by means of the movable coupling by rotating the dip pipe in the holder. Even if the dip pipe or counter piece rotates through an angle about the longitudinal axis in this manner, the displaceable component is tight against the dip pipe in the first sealing region.

In a development of the invention, the dip pipe is manufactured from a metal, in particular from a steel or from titanium or from a titanium alloy. Further, in a further development, the counter piece may be produced at least in part from a steel, from titanium or from a titanium alloy. These developments of the invention can contribute to the durability and mechanical load-bearing capacity of the dip pipe and/or counter piece, and thus to an increase in the service life of the movable coupling as a whole.

In one embodiment, the tank of the tank arrangement is in the form of a waste water tank of an aeroplane, in particular a passenger aeroplane. In this context, the pipeline which is connected to the tank may for example be in the form of an emptying line for the tank. Further, the means which is movable relative to the tank may be in the form of a connection means, in particular what is known as a "waste service panel", which is connected substantially rigidly to the fuselage outer skin. In this context, the movable coupling according to the invention may be found to be highly advantageous in the production of the fluid-bearing connection of the tank to the "waste service panel", in particular if the space for installing the waste tank and for the pipeline connection thereof to the "waste service panel" is limited.

The above embodiments and developments of the invention can be combined with one another as desired. In particular, in this context, the person skilled in the art will also add to the basic form of the present invention further combinations, which are not expressly mentioned, of features which are disclosed above or in the following in relation to the embodiments.

DESCRIPTION OF THE CONTENT OF THE DRAWINGS

In the following, the present invention will be described in greater detail by way of embodiments, with reference to the appended figures of the drawings, in which.

Figure 3:
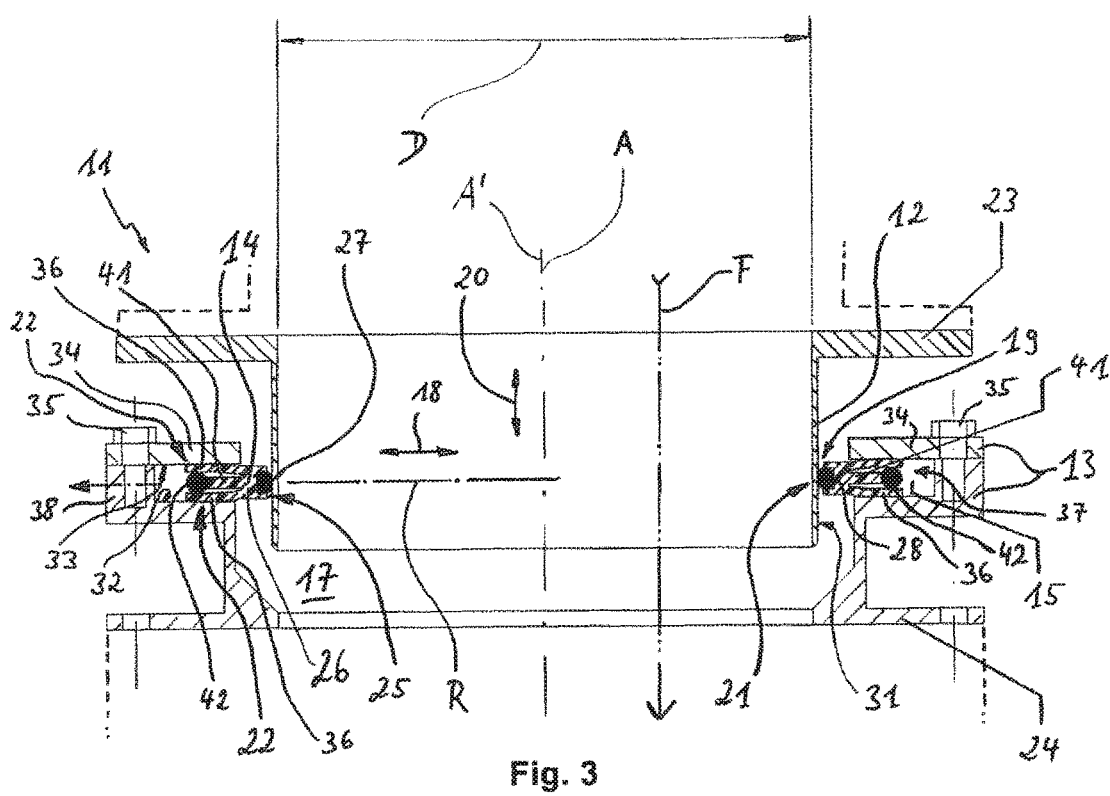
FIG. 3 is a schematic sectional drawing of a movable coupling in accordance with a second embodiment of the invention.
Figure 4:
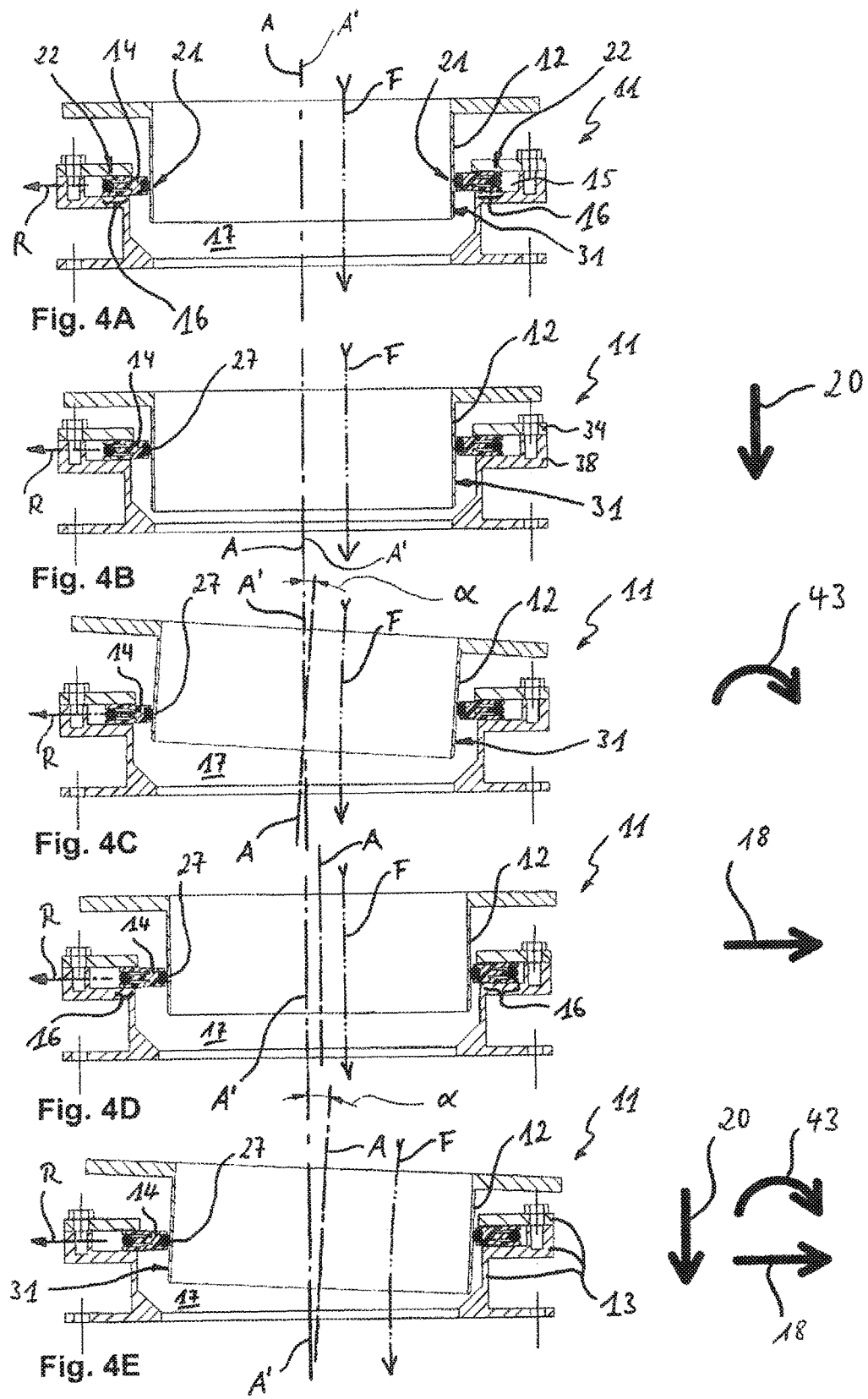
Figure 5:
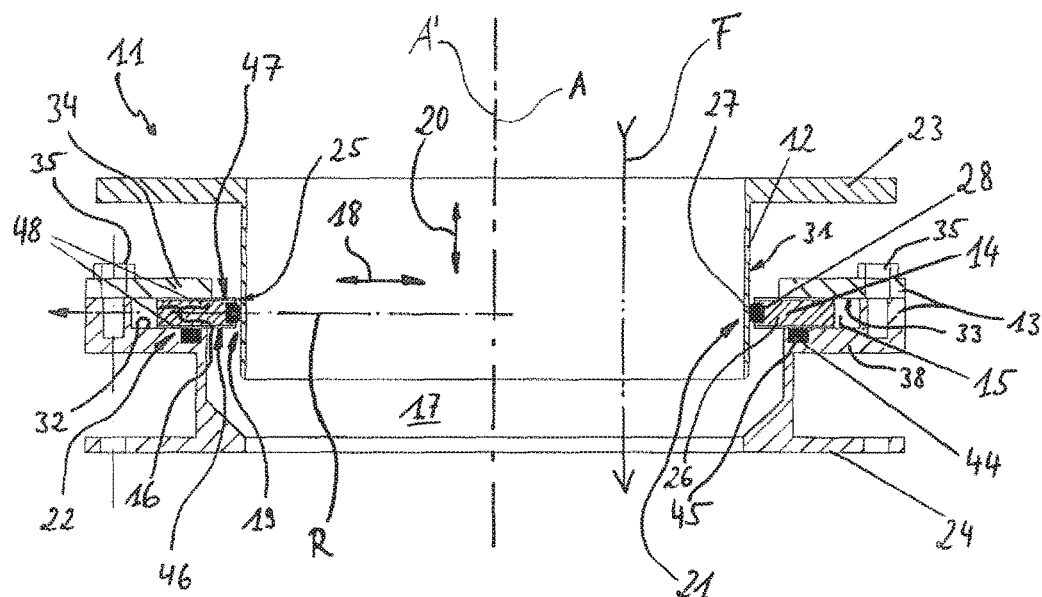
Figure 6:
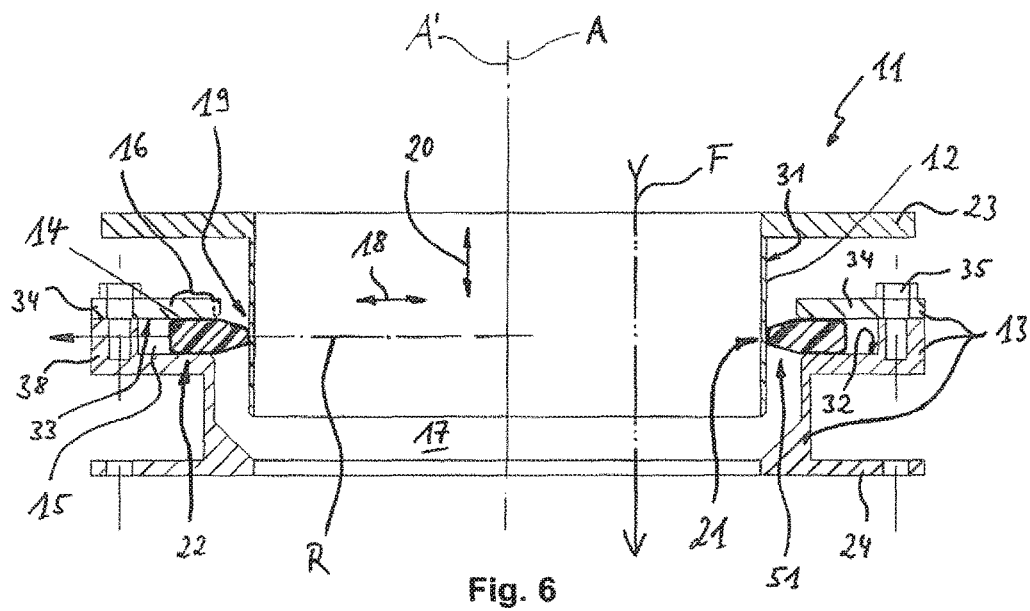
Figure 7A:
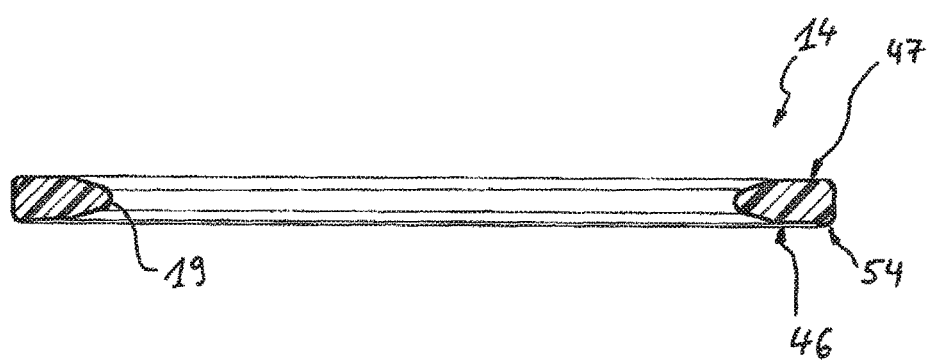
Figure 7B:
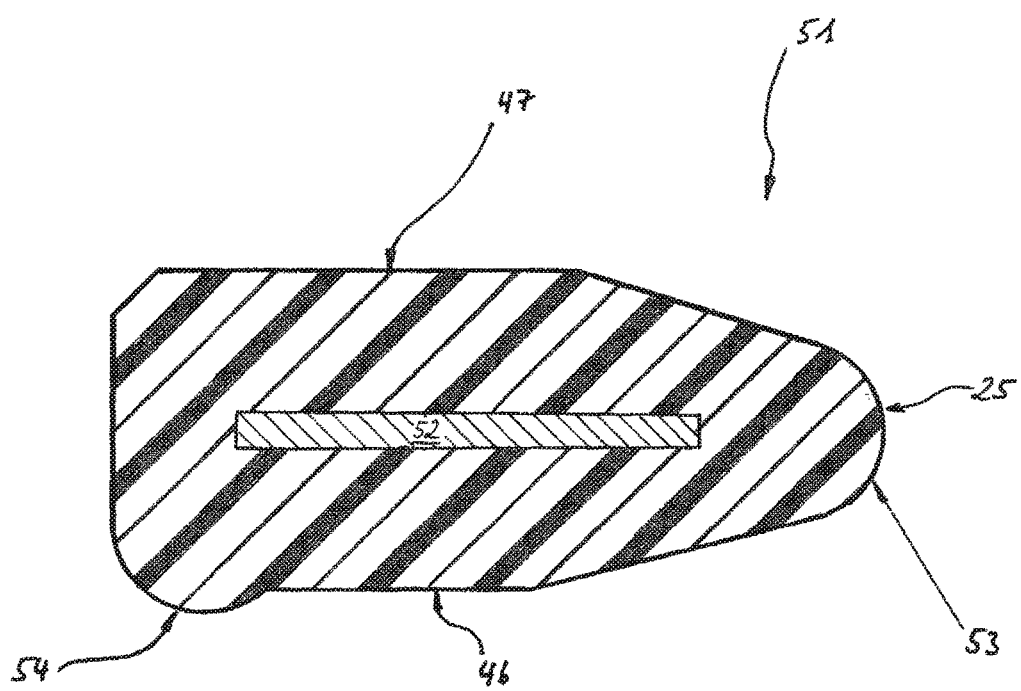

FIG. 4A-E show a plurality of states of the movable coupling of the second embodiment in accordance with FIG. 3, so as to illustrate the compensation of different linear offsets and/or angular offsets;

FIG. 5 is a schematic sectional drawing of a movable coupling in accordance with a third embodiment of the invention;

FIG. 6 is a schematic sectional drawing of a movable coupling in accordance with a fourth embodiment of the invention;

FIG. 7A is a sectional drawing of a displaceable component for the movable coupling of FIG. 6; and FIG. 7B is an enlarged view of a variant of the movable component shown in FIG. 7A.

The drawings illustrate embodiments and, when viewed in combination with the following detail description of the invention, serve to illustrate principles and concepts of the invention. In the drawings, like, functionally equivalent or equivalently acting elements, components and features are provided with like reference numerals, unless specified otherwise.

DETAILED DESCRIPTION OF THE INVENTION

Figure 1:
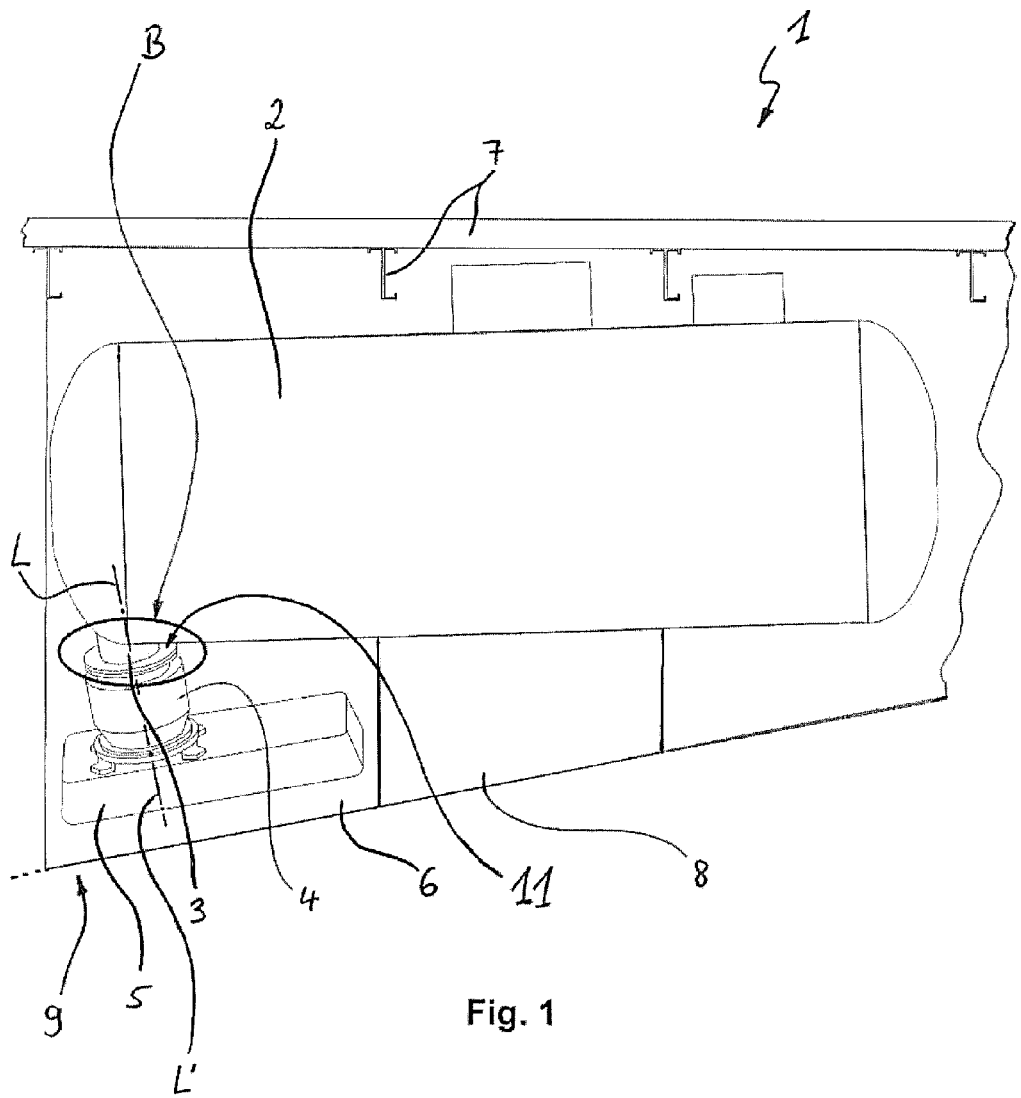
FIG. 1 shows a tank arrangement comprising a movable coupling in accordance with one embodiment of the invention.

FIG. 1 shows a tank arrangement 1 in accordance with one embodiment of the present invention. The tank arrangement 1 of FIG. 1 comprises a tank 2 in the form of a waste water tank, which is provided for the waste water from toilets, washbasins and the like with which a modern commercial passenger aeroplane (not shown as a whole in FIG. 1) is equipped, for subsequent orderly disposal at the airport.

As is further shown in FIG. 1, the tank 2 is provided, in a lower region B which is marked in FIG. 1 by a thick line, with a pipeline 3 which serves to empty the tank 2. The pipeline 3 provides a fluid-bearing connection of the tank 2 to a valve 4 which in turn is fastened to what is known as a "waste service panel" 5. The "waste service panel" 5 serves to empty the tank 2 during the regular maintenance work on the aeroplane during the idle time thereof on the ground, and can be made accessible from an outside 9 of a fuselage outer skin 6 of the aeroplane (only shown in part). The valve 4 serves to prevent or allow the release of waste water which is stored in the tank 2, as necessary.

FIG. 1 further shows part of the aeroplane fuselage which receives the tank 2, comprising the fuselage outer skin 6 and further structural components 7. During cruising, or else during flight manoeuvres, the fuselage of a modern commercial aeroplane can experience deformation and distortion as a result of pressure differences, as a result of low temperatures of the surrounding atmosphere, and also as a result of loads introduced as a result of rudder deflections. At the conventional sizes of the tank 2, which is mounted on a bearing block 8 on the fuselage structure, deformations and distortions of this type can lead to the pipeline 3, which is rigidly connected to the tank 2, being displaced relative to the "waste service panel" 5 and thus also relative to the valve 4 which is fastened thereto, transverse to the longitudinal axis L' of the valve 4 and/or along the longitudinal axis L'. In conventional waste water tanks in aeroplanes, this displacement may for example be a few millimetres, for example approximately 5 mm. Depending on the deformation and/or distortion of the fuselage, there is thus a displacement of the pipeline 3 along the longitudinal axis L' and/or an axial offset of the longitudinal axis L of the pipeline 3 relative to the longitudinal axis L' of the valve 4.

It is also possible for the movement of the tank 2 relative to the "waste service panel" 5 to lead to the longitudinal axis L of the pipeline 3 being at an inclination to the longitudinal axis L' of the valve 4, in one or more directions perpendicular to the longitudinal axes L, L', and/or to the pipeline 3 rotating about one of the longitudinal axes L, L' by a few degrees.

So as to compensate movements of the tank 2 relative to the "waste service panel" 5, the pipeline 3 is not rigidly connected to the valve 4, but instead is connected by means of a movable coupling 11. FIGS. 2 to 6 show embodiments of the coupling 11 which may advantageously be used for connecting the tank 2 of FIG. 1.

Figure 2:
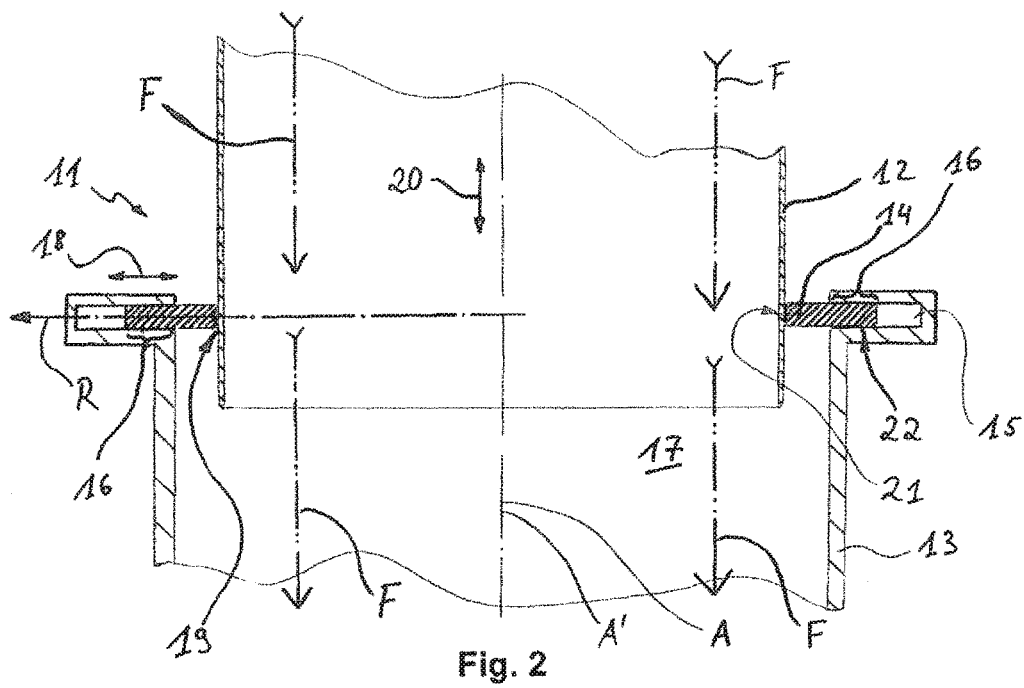
FIG. 2 is a schematic sectional drawing of a movable coupling in accordance with a first embodiment of the invention.

The first embodiment of the movable coupling 11 for a pipeline, as shown in FIG. 2, comprises a dip pipe 12, a counter piece 13 and a displaceable component 14. The counter piece 13 is equipped with a holder 15 in which a portion 16 of the displaceable component 14 is received.

The counter piece 13 is further provided with a passage 17. The dip pipe 12 is introduced into the passage 17, a lower portion of the dip pipe 12 being received in the passage 17 in the example of FIG. 2.

The holder 15 extends from the passage 17. The portion 16 is received in the holder 15 in such a way that the displaceable component 14 can be displaced relative to the counter piece 13 in a direction R which does not extend parallel to the longitudinal axis A of the dip pipe 12 but is at an inclination thereto, for example which is perpendicular to the longitudinal axis A. The displaceability of the displaceable component 14 is shown by the arrow 18.

The displaceable component 14 is further provided with a clearance 19 through which the dip pipe 12 is guided.

FIG. 2 shows the movable coupling 11 in accordance with the first embodiment in a "neutral" state, in which the displaceable component 14 is arranged in such a way that the clearance 19 is arranged substantially centrally in relation to the passage 17 of the counter piece 13. In this state, the longitudinal axis A' of the counter piece 13 extends through the centre of the clearance 19. Further, in FIG. 2 the longitudinal axes A and A' are not at an inclination to one another, but instead coincide. The dip pipe 12 extends along the longitudinal axis A' of the counter piece 13 centrally into the passage 17. In this state, the displaceable component 14 is tight against the dip pipe 12 in a first sealing region 21. Further, in this state the displaceable component 14 is tight against the counter piece 13 in a second sealing region 22. As a result, a tight fluid-bearing connection of the counter piece 13 and the dip pipe 12 is produced by means of the movable coupling 11. One possible through-flow is shown as a liquid flow F in FIG. 2 by way of a double dot-and-dash line.

If there is a displacement of the dip pipe 12 relative to the counter piece 13 in the direction R, as shown by the arrow 18, the displaceable component 14 is displaced together with the dip pipe 12 in the holder 15. The tight positioning of the displaceable component 14 against the dip pipe 12 in the first sealing region 21 and against the counter piece 13 in the second sealing region 22 is maintained during this relative movement.

A relative displacement of the dip pipe 12 and the counter piece 13 along the longitudinal axis A' can also be compensated. While the displaceable component 14 is further tight against the dip pipe 12 in the first sealing region 21, the dip pipe 12 can be inserted into or withdrawn from the passage 17 through the clearance 19. In this context, the displaceable component 14 slides on the dip pipe 12 in the first sealing region 21. The maximum displacement which can be compensated in the axial direction A' can be set by appropriate selection of the length of the portion of the dip pipe 12 which extends into the passage 17 and by selecting the length of the passage 17 in the desired manner.

FIG. 3 shows a movable coupling 11 in accordance with a further, second embodiment of the present invention. A dip pipe 12, a counter piece 13, which is tubular in form in portions, comprising a clearance 17, and a displaceable component 14 are provided. Except where specified otherwise in the following, the coupling 11 of FIG. 3 has all of the features which were mentioned in the above in relation to the first embodiment of the invention, and which will therefore not be repeated here for the sake of a brief explanation.

However, the coupling 11 of FIG. 3 differs from the coupling 11 of the first embodiment in that the dip pipe 12 and the counter piece 13 in FIG. 3 are each provided with a flange 23, 24, by means of which the dip pipe 12 or the counter piece 13 can be connected, for example substantially rigidly, to a further component so as to produce a fluid-bearing connection. The further components are shown in dashed lines by way of example. For example, the dip pipe 12 may be connected to the pipeline 3 of FIG. 1 or directly to the tank 2, and the counter piece 13 can be connected to the valve 4. Alternatively, an additional pipe portion, which is rigidly connected to the counter piece 13 and the valve 4, could be inserted between the counter piece 13 and the valve 4. However, the counter piece 13 could also be in the form of a connection portion of the valve 4.

The dip pipe 12 of FIG. 3 has a substantially circularly formed external cross-section and a substantially cylindrical outer surface 31. The internal cross-section of the clearance 19, through which the dip pipe 12 extends, of the displaceable component 14 is substantially circular in form. For an application of the coupling 11 in the tank arrangement 1 of FIG. 1 in a passenger aeroplane, the dip pipe 12 of FIG. 3 may have an internal diameter D of for example 4 inches or 100 mm, but it is also possible to select a dip pipe 12 having any other desired internal diameter.

The displaceable component 14 shown in FIG. 3 of the movable coupling 13 is formed in a plurality of parts with a base body 26 and a resilient sealing element. As is clear from FIG. 3, in the second embodiment the first sealing region 21 is arranged in the region of a surface 25 of the clearance 19, which faces the dip pipe 12. The sealing element is in the form of an O-ring 27, which is laid in a groove 28 which is provided in the first sealing region 21 in the surface 25 of the clearance 19. In the first sealing region 21, when the dip pipe 12 is not inserted, the O-ring 27 forms a rounding. When the dip pipe 12 is inserted into the clearance 19, the O-ring 27 is compressed somewhat along the circumference of the dip pipe 12, and is tight on the circumference of the outer surface 31 of the dip pipe 12 and the inner surface of the groove 28.

As is further shown in FIG. 3, the holder 15 is in the form of a shaft. The shaft fully encloses the dip pipe 12 in a circumferential direction of the dip pipe 12, and extends outwards, away from the passage 17 of the counter piece 13, substantially in the direction R, which extends radially with respect to the counter piece 13.

The holder 15 is further formed with two mutually opposing walls 32 and 33, which extend substantially parallel to one another, but not parallel to the longitudinal axis A of the dip pipe and to the longitudinal axis A' of the counter piece 13. The displaceable component 14 is guided displaceably between the walls 32 and 33 in the direction of the arrow 18. So as to be able to insert the displaceable component 14 into the holder 15 in a simple manner, in the second embodiment of the invention the counter piece 13 comprises a cover ring 34 and a base part 38, the cover ring 34 being releasably fastened to the base part 38 by means of fastening means 35, which may for example be in the form of screws. In FIG. 3, the upper wall 33 of the holder 15 is formed by the cover ring 34, whilst the lower wall 32 and a radial end wall of the holder 15 are formed by the base part 38.

On the base body 26 of the displaceable component 14, as sketched in FIG. 3, two resilient lips 36 are formed, which extend substantially in the direction R radially outwards into the holder 15. As viewed in the direction of the longitudinal axes A, A', which are coincident again in FIG. 3, the displaceable component 14 is substantially annular in form. The resilient lips 36 are preferably made symmetrical to one another and extend along the entire circumference of the circular displaceable component 14.

The resilient lips 36 are arranged on a side 37, remote from the dip pipe 12, of the displaceable component 14. On the side 27, a web 41, which is also annular in form, also extends radially in the direction R between the lips 36 of the base body 26. The web 41 is formed so as to be shorter, as measured in the direction R, than the resilient lips 36. From the side 37, a sealing ring in the form of an O-ring 42 is positioned on the web 41. As a result of the shorter form of the web 41, the O-ring 42 is arranged between mutually facing surfaces of the lips 36.

During the assembly of the displaceable component 14, the O-ring 42 is tensioned resiliently on the web 41 and is positioned against the mutually facing surfaces of the lips 36, and as a result the O-ring 42, because of the resilient deformability of the cross-section thereof, resiliently spreads the two lips 36 apart. As is shown in FIG. 3, the lips 36 are thus pressed against the walls 32 and 33 of the holder 15, and as a result the displaceable component 14 is tight against the holder 15, and thus against the counter piece 13. In the second embodiment of the coupling 11, the second sealing region 22 is thus formed both in the region of the upper wall 33 and in the region of the lower wall 32 of the holder 15.

The function of the movable coupling 11, as disclosed above in relation to the embodiment of FIG. 3, is to be explained in greater detail in the following by way of FIGS. 4A to 4E. In each of the states of the movable coupling 11 shown in FIGS. 4A to 4E, a fluid-bearing coupling is produced between the counter piece 13 and the dip pipe 12. Liquid, for example waste water, can flow through the movable coupling 11 in the direction F, without liquid escaping between the counter piece 13 and the displaceable component 14 or between the displaceable component 14 and the dip pipe 12.

FIG. 4A shows the coupling 11 in accordance with the second embodiment in the "neutral" state thereof. This is intended to denote a state in which the longitudinal axis A of the dip pipe 12 and the longitudinal axis A' of the counter piece 13 coincide with one another. In this context, the dip pipe 12 projects somewhat into the passage 17, in such a way that it can be displaced along the longitudinal axis A, A' in both directions without slipping out of the clearance 19.

A movement of this type of the dip pipe 12 relative to the counter piece 13 is shown in FIG. 4B, in which the dip pipe 12 has undergone a displacement in the direction of the arrow 20 along the longitudinal axes A, A'. In this context, the O-ring 27 slides on the outer surface 31 of the dip pipe 12. For the application sketched in FIG. 1 of the movable coupling 11, for connecting the waste water tank of an aeroplane, it may for example be provided that the dip pipe 12 can be deflected by displacement from the "neutral" position of FIG. 4A by a distance of between 5 mm and 10 mm, in either direction along the longitudinal axes A, A', without the dip pipe 12 slipping out of the clearance 19.

During the transition from the "neutral" state of FIG. 4A into the state of FIG. 4C, the dip pipe 12 undergoes an angular offset in relation to the counter piece 13, in other words a rotation 43 through an angle α about an axis which is orientated normal to the longitudinal axis A' of the counter piece 13. The O-ring 27 makes it possible to tilt the dip pipe 12, which is provided with an outer surface 31 in the form of a cylinder surface, through the angle α without untightness occurring in the first sealing region 21. Angular offsets through an angle α of between 0° and 8° can be compensated by means of the coupling 11, without the O-ring 27 being compressed significantly more strongly during angular offsets in this region than in the "neutral" state. In the application shown in FIG. 1, in aeroplane construction, the angle α which is typically to be compensated may for example be between 0° and 1°.

FIG. 4D sketches a deflection of the dip pipe 12 in the radial direction R, as shown by the arrow 18. In FIG. 4D, the longitudinal axes A and A' are no longer coincident, but do still extend mutually parallel. In the second sealing region 22, the displaceable component 14 is still tight against the counter piece 13, since the lips 36 slide on the walls 32, 33 of the holder 15. For the application shown in FIG. 1, it may for example be provided that the displaceable component 14 can be displaced from the "neutral position" by a distance of between 5 mm and 10 mm in the radial direction R.

Finally, FIG. 4E shows an compound movement of the dip pipe 12 relative to the counter piece 13, comprising a rotational movement 43 through an angle α and a displacement movement in the directions of the arrows 18 and 20.

In each of the states of the movable coupling 11, as shown in FIG. 4A to 4E, a rotation about the longitudinal axis A or about the longitudinal axis A' relative to the counter piece 13 may additionally be applied to the dip pipe 12. In this context, the O-ring 27 again slides on the outer surface 31 of the dip pipe 12 and is tight against it.

The movable coupling 11, the function of which was explained above in relation to FIG. 4A to 4E, can thus compensate movements of the dip pipe 12 relative to the counter piece 13 which may be composed of displacements in one, more than one or all three spatial directions, of rotations, in particular through small angles of up to approximately 8°, in one, more than one or all three of these spatial directions, or of any combination of displacements and rotations of this type.

The dip pipe 12 and the counter piece 13 of the second embodiment of the movable coupling 11 are preferably manufactured at least in part from a metal, for example from titanium, from a titanium alloy or from a steel.

In this embodiment, the base body 26 of the displaceable component 14 may be manufactured from a metal, for example from titanium, from a titanium alloy or from a steel, and be provided with a suitable friction-reducing coating, in particular in the region of the surfaces of the base body 26 which lie against the walls 32 and 33. For example, a PTFE (polytetrafluoroethylene) coating may be provided as a friction-reducing coating. Preferably, however, the base body 26 is manufactured from a suitable plastics material, in particular from PTFE (polytetrafluoroethylene). The O-rings 27 and 42 are preferably produced from a suitable industrial rubber material, for example from an ethylene propylene rubber (EPDM), a polyurethane rubber or a fluorosilicone rubber. For friction reduction in the first sealing region 21, the O-ring 27 may also be provided with a PTFE coating.

FIG. 5 shows a movable coupling 11 in accordance with a third embodiment of the invention in the "neutral" state thereof. The coupling 11 in accordance with FIG. 5 can compensate relative movements of the counter piece 13 and the dip pipe 12 in the same way as was described for the second embodiment. In the following, only the differences of the coupling 11 of the third embodiment from the second embodiment of the invention are described.

The movable coupling 11 of the third embodiment differs from the second embodiment in particular in that the sealing of the displaceable component 14 from the counter piece 13 is provided in a different manner. As is shown in FIG. 5, in the third embodiment the displaceable component 14 is annular in form, the cross-section thereof being substantially rectangular in form with a peripheral grove made therein. An O-ring 27 is arranged in the groove 28, and is tight against the dip pipe 12 in the first sealing region 21, as was described above for the second embodiment.

In the third embodiment too, a holder 15 for a portion 16 of the displaceable component 14 is provided, and encloses the dip pipe 12 in the circumferential direction thereof and comprises walls opposing substantially parallel walls 32 and 33.

A groove 44, which also encloses the dip pipe 12 and the clearance 19 in an annular form and in which an O-ring 45 is laid, is also made in the lower wall 32 of the holder 15. By means of the O-ring 45, which is tight against the first end face 46 of the displaceable component 14, the displaceable component 14 is sealed against the counter piece 13 in the second sealing region 22. If the displaceable component 14 is displaced in the holder 15, the O-ring 45 slides on the end face 46.

In the embodiment of FIG. 5, the displaceable component 14 comprises a base body 26, which is preferably produced from a metal, for example from a steel, from titanium or from a titanium alloy. The groove 28 is made in the base body 26. To improve the displaceability of the displaceable component 14 in the radial direction R, the displaceable component 14 may be provided with a friction-reducing coating 48, for example a coating formed with PTFE (polytetrafluoroethylene), in the region of the first end face 46 and in the region of a second end face 47. Additionally or alternatively, one or both of the O-rings 27, 45 may be provided with a PTFE coating of this type.

FIG. 6 shows a movable coupling 11 in accordance with an advantageous fourth embodiment of the invention. The differences of the coupling 11 in accordance with FIG. 6 from the coupling of the second embodiment are to be explained in the following.

In the movable coupling 11 of FIG. 6, a displaceable component 14 (shown separately in FIG. 7A) is provided, and is manufactured in one piece from a resilient material, for example from an elastomer. Possible resilient materials include in particular suitable industrial rubber materials such as an ethylene propylene rubber (EPDM), a polyurethane rubber or a fluorosilicone rubber. The movable component 14 may for example be produced by a suitable moulding process.

So as to give the single-piece displaceable component 14 even higher stability and rigidity, in a variant shown in FIG. 7B a metal inlay 52 may be cast into the resilient material, the metal inlay 52 preferably also being annular in form.

As is clear from FIGS. 7A and 7B, the displaceable component 14 of the fourth embodiment is also formed annularly, with a circular clearance 19 for passing the dip pipe 12 through.

A portion 51 of the single-piece displaceable component 14 is formed as a resilient sealing element which is tight against the dip pipe 12 in the first sealing region 21, and is set up in such a way that, as viewed in the plane in which the longitudinal axis A of the dip pipe 12 is positioned, it tapers towards the first sealing region 21. In an end region of the portion 51, the displaceable component 14 is further provided in this plane with a rounding 53, which is compressed slightly when the dip pipe 12 is introduced, resulting in the displaceable component 14 being tight against the dip pipe 12; see FIG. 6. The rounding 53 and the tapering of the portion 51 promote problem-free compensation of rotational movements 43 (see FIG. 4C).

The displaceable component 14 of the coupling 11 in accordance with the fourth embodiment is again guided between walls 32 and 33 of a holder 15 which is formed on the counter piece 13. In this context, an annular first end face 46 of the displaceable component 14 comes into contact with the lower wall 32 of the holder 15, whilst a second annular end face 47 comes into contact with the upper wall 33.

So as further to improve the tightness of the displaceable component 14 against the counter piece 13 in the second sealing region 22 in the fourth embodiment, a resiliently compressible protrusion 54, which is rounded in form, is arranged on the first end face 46. While lying against the wall 32, the protrusion 54 is already compressed by comparatively low forces, normal to the wall, when the displaceable component 14 is inserted into the holder 15. This improves the tightness in the second sealing region 22, without making it more difficult to displace the displaceable component 14 as a result of high frictional forces on the walls 32 and 33.

Preferably, the single-piece component 14 of FIGS. 6, 7A and 7B is also provided with a friction-reducing coating, in particular a coating formed with PTFE (polytetrafluoroethylene), so as to provide good displaceability with low friction against the walls 32, 33 and against the dip pipe 12, along with good sealing in the first and second sealing regions 21, 22.

Although the invention has been fully described in the above, it is not limited thereto, but can be modified in a wide range of ways without departing from the subject-matter of the present invention.

In particular, the invention is not limited to a dip pipe having a circular external cross-section, although this is particularly advantageous. It is also conceivable to apply the invention to a dip pipe having a different external cross-section, in which case the internal cross-section of the clearance is preferably adapted to the external cross-section of the dip pipe.

Moreover, it is also conceivable to coat suitable surface portions of the dip pipe and/or the holder in a friction-reducing manner, for example with PTFE, instead of a friction-reducing coating of the displaceable component and/or the O-rings.

The invention relates to a movable coupling for a pipeline, which can be applied in particular in the field of aviation and aerospace. The coupling comprises a dip pipe, a counter piece and a displaceable component. The counter piece is provided with a passage, into which the dip pipe is inserted. In this context, the counter piece is equipped with a holder which extends from the passage. The component further comprises a clearance. The dip pipe extends through the clearance. A portion of the displaceable component is received in the holder in such a way that the displaceable component can be displaced relative to the counter piece in a direction which is not parallel to the longitudinal axis of the dip pipe. When the dip pipe moves relative to the counter piece, the displaceable component is tight against the dip pipe in a first sealing region and also against the counter piece in a second sealing region.

The invention further relates to a tank arrangement comprising a tank, comprising a pipeline which is connected to the tank and comprising a movable coupling of this type, and to an aircraft or spacecraft comprising a movable coupling of this type and/or comprising a tank arrangement of this type.

LIST OF REFERENCE NUMERALS

1 tank arrangement
2 tank
3 pipeline
4 valve
5 waste service panel
6 fuselage outer skin
7 further structural components (fuselage)
8 mounting block
9 outside (fuselage outer skin)
11 movable coupling
12 dip pipe
13 counter piece
14 displaceable component
15 holder
16 portion (displaceable component)
17 passage
18 arrow (displacement movement)
19 clearance
20 arrow (displacement movement)
21 first sealing region
22 second sealing region
23 flange (dip pipe)
24 flange (counter piece)
25 surface (clearance)
26 base body (displaceable component)
27 O-ring
28 groove (first sealing region)
31 outer surface (dip pipe)
32 wall (holder)
33 wall (holder)
34 cover ring (counter piece)
35 fastening means
36 lip
37 side remote from the dip pipe (displaceable component)
38 base part (counter piece)
41 web
42 O-ring
43 arrow (rotational movement)
44 groove
45 O-ring
46 first end face (displaceable component)
47 second end face (displaceable component)
48 friction-reducing coating
51 portion (displaceable component)
52 metal inlay
53 rounding
54 protrusion
A longitudinal axis (dip pipe)
A' longitudinal axis (counter piece)
B region
D internal diameter (dip pipe)
F liquid flow L longitudinal axis (pipeline)
L' longitudinal axis (valve)
R radial direction (counter piece)
α angle

What is claimed is:

1. An aircraft or spacecraft comprising a tank arrangement, the tank arrangement comprising:
a tank;
a pipeline connected to the tank; and
a movable coupling for the pipeline, the movable coupling comprising a dip pipe;
a counter piece comprising a passage, into which the dip pipe is inserted, and a holder configured to extend from the passage; and
a displaceable component comprising a clearance, through which the dip pipe is configured to extend;
wherein a portion of the displaceable component is received in the holder in such a way that the displaceable component is displaceable relative to the counter piece in a direction which is not parallel to the longitudinal axis of the dip pipe;
wherein, when the dip pipe moves relative to the counter piece, the displaceable component is tight against the dip pipe in a first sealing region and also against the counter piece in a second sealing region; and
wherein the movable coupling is configured to couple the pipeline to a connection which is movable relative to the tank for a fluid-bearing connection of the tank to the connection.

2. The aircraft or spacecraft according to claim 1, wherein the first sealing region is arranged in a region of a surface of the clearance which faces the dip pipe.

3. The aircraft or spacecraft according to claim 1, wherein the displaceable component, as viewed in a cross-section in the plane in which the longitudinal axis of the dip pipe is positioned, is formed with a rounding in the first sealing region.

4. The aircraft or spacecraft according to claim 1, wherein the displaceable component is formed in two or more parts with a base body and a resilient sealing element which is tight against the base body and, in the first sealing region, against the dip pipe.

5. The aircraft or spacecraft according to claim 4, wherein the base body is provided with a groove in the first sealing region and wherein the sealing element is in the form of a sealing ring, which is laid in the groove.

6. The aircraft or spacecraft according to claim 5, wherein the sealing element is in the form of an O-ring which is laid in the groove.

7. The aircraft or spacecraft according to claim 1, wherein the holder comprises mutually opposing walls which are not parallel to the longitudinal axis of the dip pipe and between which the displaceable component is displaceably guided, the second sealing region being arranged in the region of at least one of the walls.

8. The aircraft or spacecraft according to claim 7, wherein one of the walls is provided with a groove in which a sealing ring, is provided in such a way that the displaceable component is tight in the second sealing region.

9. The aircraft or spacecraft according to claim 8, wherein the sealing ring provided in the groove is an O-ring.

10. The aircraft or spacecraft according to claim 1, wherein the holder is in the form of a shaft which completely encloses the dip pipe in a circumferential direction of the dip pipe and which extends outwards from the passage.

11. The aircraft or spacecraft according to claim 1, wherein an external cross-section of the dip pipe and an internal cross-section of the clearance of the displaceable component are each substantially circular in form.

12. The aircraft or spacecraft according to claim 1, wherein the tank is a waste water tank.

13. The aircraft or spacecraft according to claim 1, wherein the displaceable component, as viewed in a cross-section in the plane in which the longitudinal axis of the dip pipe is positioned, tapers towards the first sealing region.

14. The aircraft or spacecraft according to claim 1, wherein the displaceable component, as viewed in a cross-section in the plane in which the longitudinal axis of the dip pipe is positioned, is formed with a rounding in the first sealing region, and wherein the displaceable component, as viewed in a cross-section in this plane, tapers towards the first sealing region.

15. The aircraft or spacecraft according to claim 1, wherein the aircraft or spacecraft is an airplane.

* * * * *